March 13, 1945.     A. P. GLENNY     2,371,388
AUTOMATIC CONTROL SYSTEM FOR AIRCRAFT
Filed Dec. 26, 1942     2 Sheets-Sheet 2
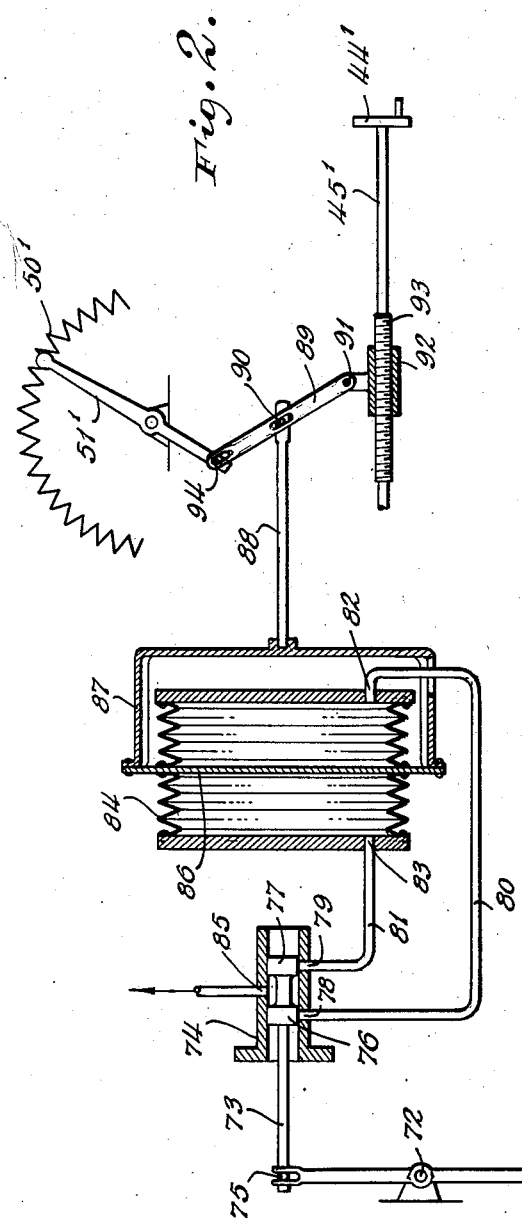
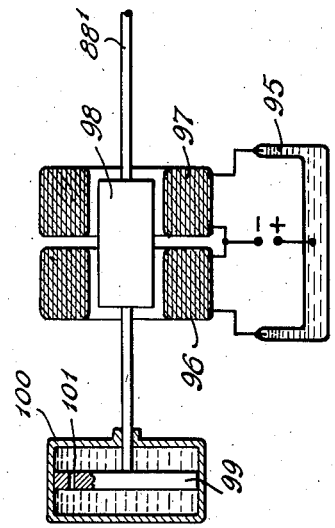
INVENTOR
ARTHUR P. GLENNY
BY
Herbert H. Thompson
his ATTORNEY Patented Mar. 13, 1945

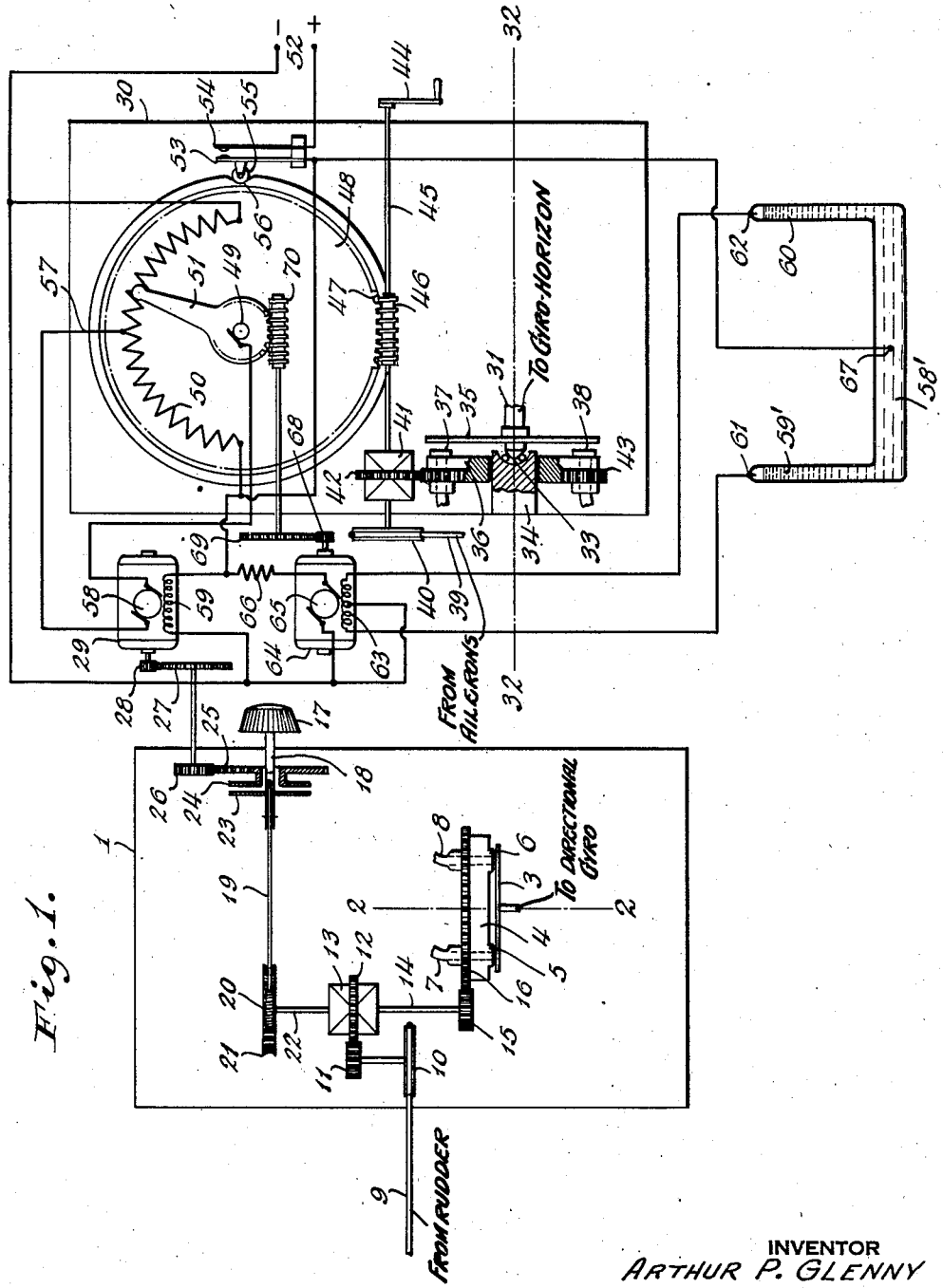

2,371,388

UNITED STATES PATENT OFFICE 2,371,388

AUTOMATIC CONTROL SYSTEM FOR AIRCRAFT

Arthur Philip Glenny, Amberley, England, assignor to The Sperry Gyroscope Company Limited, Brentford, Middlesex, England, a company of Great Britain Application December 26, 1942, Serial No. 470,287
In Great Britain August 4, 1941

5 Claims. (Cl. 244—77)

This invention relates to automatic control systems for aircraft, and, in particular, to means for causing turns to be carried out automatically at the correct angle of bank. It has been proposed to provide in an automatic pilot for aircraft a manual controller, to be operated when it is desired to produce a turn, for pre-setting the rate of turn of the craft and for simultaneously pre-setting an approximately correct angle of bank for the craft to match the rate of turn. However, as it is difficult to design apparatus to be operated from the manual controller to determine both the rate of turn and the angle of bank in a constant manner independent of temperature and power supply characteristics, errors in matching are liable to be obtained. Furthermore, the angle of bank that should be applied to match a given rate of turn is a function of the air-speed as well as rate of turn and it has so far been difficult to provide simple means for compensating for changes in air-speed to ensure that the correct angle of bank is obtained at different air-speeds.

In mechanism according to the present invention there is employed, in combination, adjustable means determining the rate of turn of the craft, other adjustable means determining the attitude or angle of bank, manual control means for presetting, simultaneously, both said means in order to determine a rate of turn and an approximately correct corresponding angle of bank for such rate, and auxiliary control means for correcting any error in matching between such preset rate of turn and angle of bank, said auxiliary control means comprising a device responsive to some phenomenon following an incorrect bank of the craft and adapted whenever it responds to incorrect bank to bring about a slow but continuous change in the adjustment of said means determining the rate of turn whereby the rate of turn is altered until the said device no longer responds. The auxiliary controller may for example be a pendulum, or an inverted pendulum, or a liquid level. When it has so readjusted the means for determining the rate of turn that the correct rate of turn for the prevailing angle of bank is attained the craft continues to turn at the new rate of turn thus determined, whereat the auxiliary control means itself ceases to exercise its correcting function, which function is not called into play again until a fresh error in matching occurs.

In general, an automatic control system for aircraft in accordance with the invention will comprise direction-maintaining means, such as an azimuth gyroscope, for controlling the heading of the craft, course-changing means adapted to alter continuously, at a substantially constant rate, the heading maintained by the direction-maintaining means, thereby producing a continuous turn of the craft, attitude-maintaining means, such as a gyro-horizon, for supervising the bank angle of the craft, manual control means for setting the rate of continuous turn due to said course-changing means and for simultaneously adjusting the bank angle of the craft maintained by said attitude-maintaining means, and rate-correcting means, controlled by a device responsive to an incorrectly-banked attitude of the craft, e. g., a pendulum, said rate-correcting means serving continuously to change the preset rate of continuous turn due to said course-changing means in a sense dependent on the sense of departure of the craft from the correct banking angle, whereby the rate of turn of the craft is altered until it matches the angle of bank.

The invention will be more readily understood by referring to the accompanying drawings wherein Fig. 1 is a schematic diagram of an automatic control system for aircraft in accordance with the invention.

Fig. 2 is a schematic diagram of alternative means of correcting the rate of turn set on a potentiometer arrangement similar to that of Fig. 1 under the control of a pendulum or the like.

Fig. 3 is a sectional detail showing a third modification of the invention.

In the system of Fig. 1 I is the casing of a gyroscopic control unit serving to control the rudder of the craft to maintain the craft in a predetermined direction. In the case shown the gyroscope is an azimuth gyroscope, generally known as a directional gyroscope, having a horizontal axis which maintains a constant direction in spite of turning of the craft in azimuth. A semi-circular disc 3 lying in a horizontal plane is rigidly attached to the vertical ring of the gyroscope and is therefore maintained by the gyroscope in a constant orientation about the axis 2—2. (Parts of the gyroscope other than the disc 3 are not shown in the drawings.) Also mounted for rotation about the axis 2—2 is a pick-off member 4 provided with two diametrically opposite air ports 5, 6 communicating with pipe connections 7, 8, which lead to control apparatus external to the casing 1. The interior of casing 1 is maintained at sub-atmospheric pressure by a suction pump (not shown), with the result that air is drawn in through the pipes 7, 8 to escape into the interior of the instrument through whichever of the ports 5, 6 is not covered by the semi-circular disc 3. The ports 5, 6 are narrow and are normally bisected by the diametral edge of the semi-circular disc 3, so that equal volumes of air flow through the two ports. However, if the aircraft turns in azimuth away from its original direction, the pick-off member turns relatively to the gyroscopically positioned disc 3, with the result that one of the ports 5, 6, is covered by the disc and the other uncovered. The resulting unbalance in the air flows through the pipes 7, 8, creates a pressure difference between these pipes which is used to initiate control of a rudder servo-motor (not shown), which applies rudder to correct the deviation of the craft and to restore it towards its course. In order to limit the extent of movement of the rudder produced by the control system in response to a given deviation of the craft, a "repeat-back" connection is provided from the rudder servo-motor to the pick-off member 4. For this purpose movements of the servo-motor are applied through a repeat-back cable to a pulley 10; a gear wheel 11 on the shaft of this pulley meshes with a gear 12 attached to the casing of a differential 13 and thereby drives shaft 14, which in turn operates through gearing 15, 16, to turn the pick-off member 4 in the opposite sense to the deviation of the craft. In this way the servo-motor moves only through a distance sufficient to bring the pick-off member 4 back into alignment with the disc 3, and therefore the applied rudder angle is limited to be proportional to the deviation of the craft.

Provision is made for setting a course to be maintained. For this purpose the pick-off member 4 may be adjusted relatively to the craft by means of the course-setting knob 17 which is carried on a hollow shaft 18 splined on a co-axial shaft 19. A worm 20 on this shaft engages with a worm wheel on a shaft 22, which is an input shaft into differential 13 and is co-axial with the output shaft 14. The hollow shaft 18 is normally spring-urged to the right until a friction clutch plate 23 secured to it becomes clutched to a co-operating plate 24 solid with gear 25. Gear 25 and plate 24 are rotatably mounted on a sleeve surrounding hollow shaft 18, but may be taken as members normally locked against rotation. Normally, therefore, hollow shaft 18, together with the shaft 19 splined to it, are locked against rotation by means of the friction clutch 23, 24. However, if the course-setting knob 17 is pushed inwards, i. e., to the left in Fig. 1, the clutch plate 23 is disengaged from the plate 24 and shaft 19 may be rotated from the knob 17. This operation rotates the pick-off member 4 relatively to the disc 3, whereby the automatic control system is energised to apply rudder to turn the craft to bring the pick-off member 4 back into alignment with the disc 3. In this way the heading of the craft that is maintained by the automatic control system is altered by the amount of the angular movement produced in the pick-off member 4 by the course-change knob 17.

The gear 25 meshes with a gear 26, which is in gearing engagement through gears 27, 28 with a motor 29. This motor is normally stationary, and this fact, in conjunction with the friction in the gearing 25, 26, 27, 28, serves as the means that normally hold the clutch plate 24 against rotation. However, if the motor 29 is energised it operates to drive the gearing 28, 27, 26, 25, and therefore, through the clutch 24, 23, to turn continuously the course-setting knob 17 and the course-change shaft 19. In this way a continuous rotation of the pick-off member 4 relative to the craft is produced about the axis 2—2; consequently the motor 29 acts to alter continuously the heading maintained by the automatic control system. Motor 29 may therefore be referred to as the course-changing motor. It is to be noted that energisation of motor 29 will produce a continuous turn of the craft at a substantially constant rate which is proportional to the speed of the motor.

The parts so far described are similar to those present in a number of previous automatic control systems provided with course-changing motors, and no claims are made to any features thereof. The present invention is concerned solely with the manner in which course-changing means, such as the course-changing motor 29, is controlled.

The automatic control system of the invention also includes means for controlling the attitude of the craft about the bank axis at least. In Fig. 1 the primary instrument for supervising the angle of bank of the craft is a vertical axis gyroscope (not shown) in a casing 30. The normally horizontal gimbal ring 31 of this gyroscope is mounted for rotation about a fore-and-aft axis 32 in pivot bearings, one of which is shown at 33, in a support 34 fixed in the casing 30, and a semi-circular cut-off disc 35, similar to the disc 3 but lying in a vertical plane, is secured to this gimbal ring. This cut-off disc is adjacent to a pick-off member 36, similar to the member 4 and similarly provided with ports 37, 38 through which air is drawn into the interior of casing 30. A servo-motor (not shown) for actuating the ailerons is controlled from the ports 37, 38 in the same manner as the rudder servo-motor is controlled from the ports 5, 6. A repeat-back connection from the aileron servo-motor is provided by the repeat-back cable 39, pulley 40, differential 41 and gearing 42, 43. The operation of these parts is the same as in the corresponding rudder control arrangement. It follows that the automatic control system operates to maintain the aircraft at such an angle about the fore-and-aft axis that the ports 37, 38 are aligned with the diametral edge of the cut-off disc 35. Normally the system is adjusted so that when this condition is satisfied the craft is flying level. However, the bank angle of the craft may be altered and adjusted to any desired value by the bank-setting handle 44. Turning of this handle causes rotation of shaft 45, and this rotation is applied through differential 41 to rotate the pick-off member 36 about the axis 32 to cause the automatic control system thereafter to maintain the craft in a banked attitude.

The bank-setting handle 44 also serves, by means of the worm 46 and gear 47, to turn the disc 48 about the axis 49. On this disc there is mounted an arcuate potentiometer winding 50 on which runs a contact arm 51 rotatably mounted about the axis 49 of the disc 48. A source 52 of electric current is connected to the two ends of the potentiometer winding 50, the positive connection, however, being taken through a pair of contacts 53, 54. These contacts are closed by means of a roller 55, actuated by a cam 56 whenever the disc 48 is turned from its normal position, i. e., whenever the bank-setting handle 44 has set a bank. The potentiometer 50 is therefore energised only when a bank has been set manually. The contact arm 51 and the centre point 57 of the potentiometer winding are connected to the armature 58 of the course-changing motor 29, whose field winding 59 is connected to the source 52, also through the energising contacts 53, 54.

Normally the contact arm 51 is on the centre tap 57 of the potentiometer winding so that no voltage is applied to the armature 58 of motor 29, with the result that the motor does not run. If a bank is set by the handle 44, the disc 48 is turned correspondingly and the winding 50 is displaced, with the result that a portion of the potentiometer winding is included between the arm 51 and the centre point 57. The voltage across this portion of the winding is applied to the armature 58 of the course-changing motor, which is therefore set into motion to alter the heading of the craft at a substantially constant rate, thereby producing a continuous turn of the craft. To every angle of bank set by the handle 44 there corresponds a particular arcuate length of the potentiometer winding that is included between arm 51 and centre contact 57. The length thus included determines the voltage that is applied to motor armature 58 and therefore determines the speed of the course-changing motor; the potentiometer 50 may therefore be regarded as the means for setting the rate of turn of the craft. Preferably the potentiometer is so graded that, when handle 44 sets a bank by turning the pick-off member 36, it simultaneously sets on potentiometer 50 a rate of turn for the craft that correctly corresponds to the bank angle, so that the turn is carried out at the correct angle of bank to avoid the occurrence of side-slip.

It is difficult to ensure that the angle of bank and the rate of turn that are set by the handle 44 will correctly correspond under all the varying conditions that are likely to occur, such as variations in the supply voltage, variations in temperature, variations in the load on motor 29, and variations in the air-speed of the craft. If the bank angle and the rate of turn are not correctly matched, the craft will carry out an incorrectly banked turn and will side-slip either inwards or outwards.

According to the invention such side-slipping is detected and automatically corrected. In the system of Fig. 1 side-slip is detected by a liquid pendulum, or level, 58', this consisting of a tube lying athwartships in the craft and terminating in upright arms 59', 60. The tube is filled with mercury to within a short distance from the top of the two upright arms, in which are located contacts 61, 62. The contacts 61, 62 are connected to opposite ends of a split-field winding 63 in a second electric motor 64 whose armature 65 is energised from the source 52 through contacts 53, 54 and current limiting resistance 66. The centre point of the split-field winding 63 is connected to the negative pole of the source 52, while the mercury in tube 58 is connected via electrode 67 with the positive pole of the source. It follows from this that, if, as a result of side-slip of the craft, the mercury in the level 58 flows to one end of the tube 58, say, the end 60, so as to make contact with the contact 62, the corresponding half of field winding 63 is energised and the motor 64 starts to run. The motor is connected by gearing 68, 69 and worm 70 to turn the pointer 51 about the axis 49. The resulting angular displacement of the arm 51 from its normal position alters the voltage picked off from the potentiometer 50 and applied to the armature 58 of motor 29; it thus alters the set speed of the course-changing motor and therefore the rate of turn of the craft, increasing the rate of turn if side-slipping is inwards, and decreasing the rate of turn if side-slipping is outwards.

It is particularly to be noted that the motor 64 runs as long as side-slipping is detected by the liquid level device 58, so that the setting of potentiometer 50 is slowly continuously altered throughout the occurrence of side-slip, the initial banking angle being set up directly by handle 43 operating to tilt the pick-off ports 37, 38 immediately upon the instigation of a turn. The rate of turn therefore changes continuously, and only ceases to change when side-slip ceases, i. e., when the rate of turn is such that the craft is correctly banked. Moreover, it is to be noted that the correct rate of turn is thereafter maintained, because the correcting adjustment made to the potentiometer arm 51 by the motor 64 under the control of the side-slip detector is not removed when side-slip ceases. In other words, the motor 64 acts as an integrating device, working between the side-slip detector (liquid level 58) and the means (potentiometer 50 and arm 51) on which the rate of operation of the course-changing means (motor 29) is set, to make the setting of such rate proportional to the time integral of the indication provided by said side-slip detector.

It is evident that, even if the handle 44 for setting the angle of bank were not used also to turn disc 48 and thus set a rate of turn, the side-slip detector 58 and motor 64 would adjust the arm 51 until a correctly banked turn finally resulted. However, by arranging that the bank setting handle 44 also directly sets an approximately corresponding rate of turn it is ensured that very little side-slip occurs even at the beginning of the turn.

Fig. 2 illustrates alternatives to some elements of Fig. 1. Instead of the liquid pendulum 58 a simple pendulum 71 pivoted about a fore-and-aft axis 72 is used as the device responsive to incorrect bank or side-slip. Movement of the pendulum 71 about axis 72 relative to the craft produces a displacement of the piston rod 73 of the slide valve 74 by means of a fork and pin engagement 75. The slide valve has two pistons 76, 77 covering ports which are in communication through pipes 80, 81 and very restricted orifices 82, 83 with the ends of a partitioned bellows 84. A third port 85 is provided in the cylinder wall of slide valve 74, between the pistons 76, 77; this leads to a suction pump (not shown). The central partition 86 of the bellows 84 is extended radially outwards beyond the circumference of the bellows and a bridge 87 is attached to the extension; to this is fixed a rod 88 engaging with a floating lever 89 by a pin and slot connection 90. The lever 89 is pivoted at 91 on a nut 92 travelling on a threaded partition 93 of a shaft 45' to which is secured the manual control handwheel 44', corresponding respectively to shaft 45 and handle 44 of Fig. 1. The other end of the floating lever 89 engages by means of the pin and slot engagement 94 with the contact arm 51' for the stationary potentiometer winding 50'. This potentiometer 50', 51', being subject, like the potentiometer 50, 51 of Fig. 1, to adjustment both by the manual control means and by the side-slip detecting means, controls in a similar manner a motor corresponding to the course-changing motor 29 of Fig. 1 and serving the same purposes as that motor.

The operation of this system is similar to that of Fig. 1. If the pilot wishes to produce a banked turn through the automatic control system, he turns handwheel 44' in the appropriate direction to set the required angle of bank on the pick-off 36 at the gyro-horizon. As a result the nut 92 will be displaced along the screw 93, thereby rocking the lever 89 about the pin 90 to cause the contact arm 51' to become displaced from its central position on potentiometer 50. Motor 29 is therefore set into operation to produce a turn of the craft at a rate defined by the setting of potentiometer arm 51 on the potentiometer winding 50. The parts are so proportioned that the rate of turn thus set corresponds, at least approximately, to the bank angle also set by handwheel 44', so that side-slip should not occur.

If there should be any discrepancy between the bank angle and the rate of turn thus set, side-slip will occur and pendulum 71 will be deflected from its normal position relative to the craft. Suppose that this has occurred, the pendulum 71 being deflected to the right and the valve rod 73 to the left. The result is that port 78 is put into communication with port 85 and therefore with the suction pump, while port 79 is put into communication with the atmosphere. A difference of pressure is therefore applied to pipes 80, 81, as a result of which air flows into the left hand end of the bellows and out of the right hand end, so that the central partition 86 moves to the right. Owing to the restrictions 82, 83, this movement is slow, and, as the extent of movement available to the partition 86 is large, the partition moves continuously to the right, causing the floating lever 89 to turn clockwise about the pivot pin 91 and thus to move the contact arm 51' on the potentiometer winding 50 and so to alter the rate of turn of the craft set by the potentiometer. The rate of turn of the craft goes on altering until the deflection of the pendulum 71 becomes so small that the valve pistons 76, 77 cover the ports 78, 79. Here again, when the correct rate of turn has been reached and the pendulum 71 has been restored to its central position relative to the craft, the rate of turn remains set on the potentiometer.

In the arrangement of Fig. 3 the side-slip detector is a mercury level 95 as in Fig. 1 but is connected to energise one or other of the opposed windings 96, 97 of a solenoid whose armature 98 is normally centralised between these windings. The armature 98 is connected on the one hand to a shaft 88' corresponding to, and serving the same purpose as, the shaft 88 of Fig. 2, while on the other hand it is connected to the piston 99 of a fluid-filled dash-pot 100. A bleed hole 101 is provided through the piston 100.

If side-slip should occur, the appropriate winding of the solenoid is energised and the armature 98 is pulled towards that winding. The dash-pot 101 and piston 99 make the movement slow and continuous, with the result that the rate of turn of the craft set on the potentiometer is continuously altered until a value is reached at which substantially no side-slip occurs. The solenoid is then de-energised and the armature 98 ceases to move. It is to be noted that there is no centralising spring on the armature 98. In effect therefore the solenoid and armature arrangement is used as an electric motor to produce a continuously increasing adjustment as long as it is energised.

The invention has so far been described when applied to an automatic control system in which the primary control instrument is a gyroscope that maintains its orientation when the craft turns, and in which therefore a turn is produced by turning a pick-off device 4 at the gyroscope relatively to the craft. However, the invention is not limited in its application to control systems of this type, but obviously may be applied to other types of airplane automatic pilots, such as those in which a directional gyro is caused to precess for causing turns, as shown, for instance, in the patent to E. A. Sperry, Jr., No. 1,982,702, for Gyro pilots for aircraft, dated December 4, 1934.

I claim:

1. An automatic control system for aircraft, including, in combination, adjustable means for causing a turn of the craft at some selected rate, adjustable means for causing a bank of the craft, manual control means for pre-setting, simultaneously, both the rate of turn and an approximately correct corresponding angle of bank, and auxiliary control means comprising a device responsive to an incorrect angle of bank and means operated thereby for causing a slow, continuous adjustment of the rate of turn until said device no longer responds.

2. An automatic pilot system for aircraft comprising direction-maintaining means for controlling the heading of the craft, course-changing means adapted to alter continuously, at a selected rate, the heading maintained by the direction-maintaining means, thereby producing a continuous turn of the craft at the selected rate, attitude-maintaining means for supervising the bank angle of the craft, manual control means for setting the selected rate of continuous turn and for simultaneously adjusting the bank angle of the craft maintained by said attitude-maintaining means, a device responsive to an incorrect attitude of the craft in bank, and rate-correcting means controlled by said device for slowly and continuously changing the pre-set rate of turn in a sense dependent upon the sense of departure of the craft from the correct banking angle until the rate of turn matches the angle of bank.

3. An automatic pilot for aircraft comprising servo means for controlling the course of the craft, additional servo means for controlling the banking of the craft, control means for each of said servo means, said control means including a common means for effecting an operation of both said servo means to cause turning at a desired rate of turn, and a proportionate banking thereof, and means operable as a result of a skid or slip of the craft during such turn to effect a gradual readjustment of the rate of turn until such skid or side slip is substantially eliminated.

4. In an automatic pilot for aircraft comprising servo means for controlling the aircraft in attitude about its fore and aft or bank axis and servo means for controlling the heading thereof, means for providing a directional reference, means for providing an attitude reference, means including signal-generating means associated with said reference means for respectively controlling said directional and attitude servo means, manually controlled means for controlling said servo means to effect predetermined rates of turn of said craft and banking angles proportional to such rates, and means responsive to slip or skid of the aircraft for altering the relation between such rate and banking angle until such slip or skid is eliminated.

5. In an automatic pilot for aircraft, servo means for controlling the heading and banking of the craft, a common control means including means for providing a variable rate of turn reference for controlling said servo means to effect a turn at a selected rate and simultaneously a proportionate bank of said craft, and integrating means responsive to slip or skid of the aircraft for slowly altering the relation between such rate and banking angle until such slip or skid is eliminated.

ARTHUR PHILIP GLENNY.